US007353990B2

(12) United States Patent
Elliot et al.

(10) Patent No.: US 7,353,990 B2
(45) Date of Patent: *Apr. 8, 2008

(54) PORTABLE TRANSACTION TERMINAL HAVING AN IMAGE RECOGNITION SYSTEM

(75) Inventors: Russell W Elliot, Endicott, NY (US); Michael A Heaton, Owego, NY (US); Jeffrey S Poulin, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/456,801

(22) Filed: Jul. 11, 2006

(65) Prior Publication Data

US 2006/0237530 A1  Oct. 26, 2006

Related U.S. Application Data

(63) Continuation of application No. 10/874,313, filed on Jun. 24, 2004, now Pat. No. 7,118,032.

(60) Provisional application No. 60/495,130, filed on Aug. 15, 2003.

(51) Int. Cl.
*G06K 5/00* (2006.01)

(52) U.S. Cl. .................. 235/380; 235/454

(58) Field of Classification Search .......... 235/380, 235/462.01, 454; 382/137; 705/35–45
See application file for complete search history.

(56) References Cited

U.S. PATENT DOCUMENTS

| 5,786,585 | A | | 7/1998 | Eastman et al. |
|---|---|---|---|---|
| 6,131,811 | A | * | 10/2000 | Gangi .................. 235/380 |
| 6,144,848 | A | | 11/2000 | Walsh et al. |
| 6,422,459 | B1 | | 7/2002 | Kawan |
| 6,579,728 | B2 | | 6/2003 | Grant et al. |
| 6,726,094 | B1 | * | 4/2004 | Rantze et al. ............. 235/379 |
| 6,824,061 | B1 | | 11/2004 | Hattersley et al. |
| 6,860,428 | B1 | | 3/2005 | Dowling et al. |
| 6,937,985 | B2 | | 8/2005 | Kuma |
| 7,118,032 | B2 | * | 10/2006 | Elliot et al. .............. 235/380 |
| 2001/0037249 | A1 | | 11/2001 | Fitzgerald et al. |
| 2002/0004752 | A1 | | 1/2002 | Kuma |
| 2002/0128040 | A1 | | 9/2002 | Romano et al. |
| 2002/0145050 | A1 | * | 10/2002 | Jayaratne ................ 235/492 |
| 2004/0030659 | A1 | | 2/2004 | Gueh |

FOREIGN PATENT DOCUMENTS

| JP | 05282527 A | * | 10/1993 |
|---|---|---|---|
| JP | 10063917 A | * | 3/1998 |

* cited by examiner

*Primary Examiner*—Daniel Hess
(74) *Attorney, Agent, or Firm*—Greenblum & Bernstein, P.L.C.

(57) ABSTRACT

Portable transaction terminal includes a processor, an imager configured to produce a digital image of a payment card using a source of continuous light, the imager being operably linked to the processor, and an image recognition module that performs image recognition and that is configured to produce or extract data for a transaction, from the digital image of the payment card, using the processor. The portable transaction terminal is configured to enter the data for the transaction that is produced or extracted, and wherein the data for the transaction is communicated and processed.

29 Claims, 4 Drawing Sheets

PORTABLE TRANSACTION TERMINAL HAVING AN IMAGE RECOGNITION SYSTEM

CROSS-REFERENCE TO RELATED APPLICATION

The present application is a continuation of U.S. application Ser. No. 10/874,313 filed Jun. 24, 2004, the disclosure of which is expressly incorporated by reference herein in its entirety. This application claims also priority to U.S. Provisional Application No. 60/495,130, which was filed on Aug. 15, 2003, the entire contents of which are incorporated by reference herein.

BACKGROUND OF THE INVENTION

1. Field of the Invention

This invention generally relates to transaction terminals, and more particularly, to a portable unit having an image recognition system for producing information from images and a location system for determining location of the terminal.

2. Background Description

Portable transaction terminals enable transaction processing at various locations. Such devices typically include a keypad and/or touch sensitive screen, a display screen, a magnetic stripe reader for reading information from credit and debit cards (collectively, "cards"), possibly a barcode scanner, and various internal components for processing and managing data, such as a processor, memory and software. By way of example, such devices may be used to process credit and debit card payments as well as coupons, or to track articles picked-up or dropped-off. While these devices greatly facilitate transactions, they have several shortcomings.

First, such devices equipped with magnetic stripe readers rely on the integrity of a card's magnetic stripe to successfully read information stored on the stripe. If the magnetic stripe is unreadable, which may be due to dirt, scratches or erasure, the card information must be entered manually. However, manual entry is tedious, inefficient and conducive to error.

Another problem concerns misalignment of the card during swiping. A magnetic stripe reader will not properly read data from a card that is not seated properly during swiping, as is often the case with handheld terminals. The card must then be re-swiped or the information must be entered manually.

Data input problems also plague handheld transaction terminals equipped with barcode scanners. If a barcode is damaged (e.g., scratched, creased, faded or soiled) or concealed, a barcode scanner may not be able to properly read the information. In the event the barcode is unreadable, manual entry of the numeric code corresponding to the barcode may be necessary. Misread information may go undetected, resulting in an erroneous transaction.

Another problem arises from the portability of such transaction terminals and the inability to record location at the time of use. While such terminals can be used almost anywhere, the location of use is typically not automatically determined. Thus, records showing that a transaction occurred would not confirm that the transaction occurred at a correct or authorized location. For example, records may show that a missing parcel was delivered to an address, but would probably not include information to corroborate that the delivery person was at the correct location at the time of delivery.

The invention is directed to overcoming one or more of the problems as set forth above.

SUMMARY OF THE INVENTION

In one aspect of the invention, a portable transaction terminal is provided. The terminal includes a processor. It also includes an imager configured to produce digital image data using a source of continuous light during production of the digital image data. The imager is operably linked to the processor. The terminal further includes an image recognition module configured to produce data for a transaction, from the digital image data, using the processor.

In another aspect of the invention, the portable transaction terminal is configured for displaying an image. This embodiment includes a processor. It also includes an imager configured to produce digital image data using a source of continuous light during production of the digital image data. The imager is operably linked to the processor. An image recognition module configured to produce data for a transaction from the digital image data using the processor is also provided. This embodiment of the terminal further includes a display operably linked to the processor. The display is configured to display an image or data corresponding to the digital image data.

In a further aspect of the invention, a method of transaction processing using a portable transaction terminal having an imager and an image recognition module is provided. The method entails producing image data corresponding to an object, producing transaction information from the image data, and performing one or more transaction steps using the transaction information produced from the image.

BRIEF DESCRIPTION OF THE DRAWINGS

The foregoing and other objects, features and advantages of the present invention will become better understood with reference to the following description, appended claims, and accompanying drawings, where:

DETAILED DESCRIPTION OF EMBODIMENTS OF THE INVENTION

The invention is directed to a portable transaction terminal that has an image recognition system and may optionally have a location system. The terminal includes components for inputting, processing, storing, displaying, transmitting and receiving information. An imager produces images for the image recognition system. The image recognition system produces information from the images for transaction processing. A location system, such as a global positioning system receiver and chipset, may determine location based on signals received from satellites. The imager and image recognition system of the portable transaction terminal thus enable transaction processing without manual entry of transaction data and without magnetic stripe reading. The optional location system enables recording location of the terminal at the time a transaction is processed.

SYSTEM OF THE INVENTION

Figure 1:
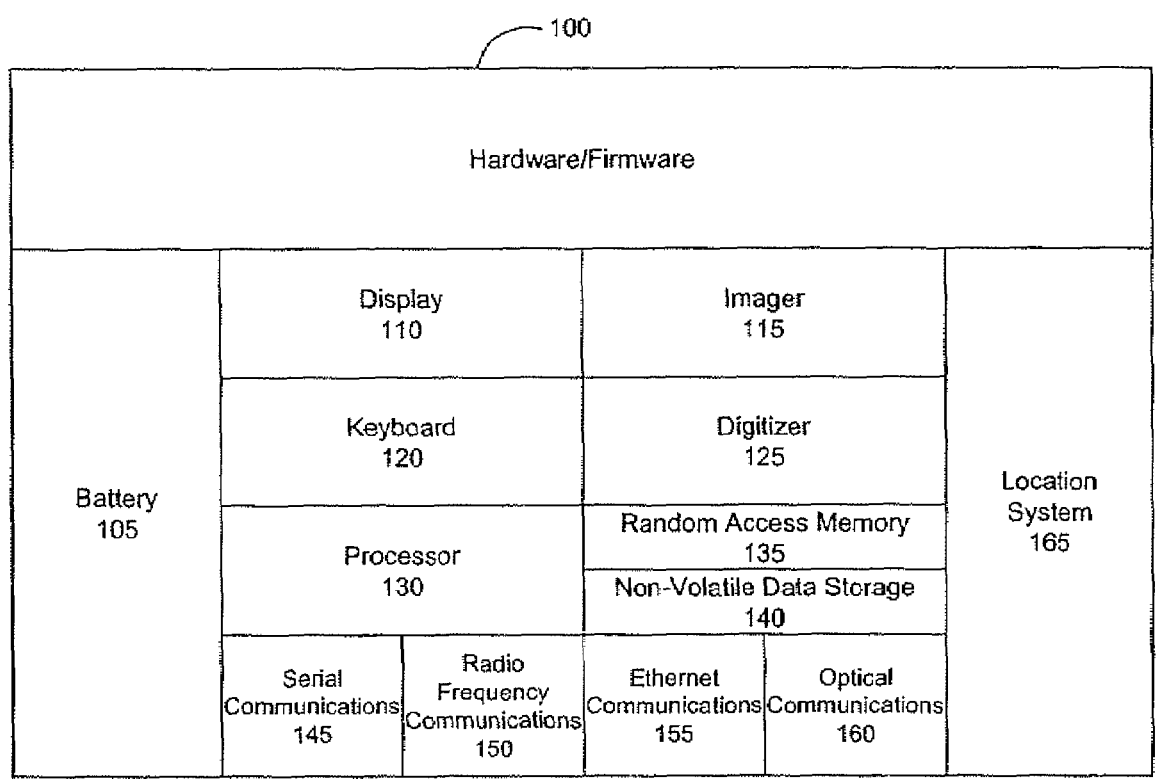
FIG. 1 shows a high-level block diagram of a portable transaction terminal in accordance with an exemplary embodiment of the invention.

A transaction terminal according to the invention may take many forms. FIG. 1 shows a block diagram conceptually illustrating hardware components of a transaction terminal 100 in accordance with an exemplary embodiment of the invention. The exemplary terminal includes a power supply 105 (e.g., one or more rechargeable or disposable batteries, and/or an A/C power cord with an A/C to D/C transformer). An imager 115 is provided for digitally capturing an image. Input devices such as a keyboard 120 and/or a digitizer 125 are used for entering data or commands. A processor 130 performs data and numeric computations. A random access memory 135 is used for temporary program and data storage. A non-volatile data storage device 140 may be provided for non-volatile program and data storage.

Still referring to FIG. 1, optional components include a display 110 for visual output. A location system (e.g., a global positioning system (GPS)) 165 for receiving and processing geographic location information may also be provided.

Additionally, one or more communication ports, such as a serial communications interface 145 (e.g., RS 232) and/or a Universal Serial Bus (USB) port may be provided for communications with a peripheral or another system or subsystem. A transceiver 150 may be provided for wireless communications. Other communications ports may include a network communications interface 155 (e.g., an IEEE Standard 802.3 Ethernet port) and/or an optical communications device 160 (e.g., an infrared device for communication in accordance with Infrared Data Association, IrDA, standards) for wireless optical communications with a peripheral, subsystem or system. Illustratively, using a port, transceiver and/or interface, information may be transmitted to a central system from the terminal either in real time, whereby information is transmitted at or about the time of a transaction, or in batch mode, whereby information is transmitted to a central system after a number of transactions have been completed.

Various components are operably linked, meaning they are directly or indirectly communicatively connected to enable signals or data to be provided to or accessed on one component from the other component. For example, a display 110, input device 120, digitizer 125, processor 130, non-volatile storage device 140, imager 115, transceiver 150 and location system 165 may be communicatively linked, either directly or indirectly (e.g., with intervening circuitry, controllers, ports and devices), to a communications bus (i.e., a data bus).

The aforementioned terminal 100 is intended to represent a broad category of portable terminals capable of supporting transaction processing using an imager 115. Of course, the terminal may include fewer, different and/or additional components, provided it is capable, when programmed, of performing transaction processing functions using an imager 115 in accordance with the invention.

The imager 115 produces digital images of objects (i.e., image data corresponding to objects). The objects may include any articles that contain information relevant to a transaction or any subject matter having an image that is relevant to a transaction. For example, a mail piece such as a letter or parcel; a payment card such as a credit, debit or smart card; commercial paper such as a checks or other negotiable instruments and securities; an identification article such as a driver's license, badge, passport, birth certificate, immigration visa, identification card or vehicle registration; a pass such as a travel ticket, event pass or ticket, or boarding pass; inventory; goods such as merchandise; a meter such as digital or analog gauge; all may display indicia that are relevant to a transaction. Additionally, images of objects such as people, animals, places, vehicles and structures, may be relevant to a transaction. As these are examples of suitable objects, those skilled in the art will appreciate that the imager may be configured and/or used to capture images of other objects without departing from the scope of the invention.

An image recognition system (discussed below) produces data (e.g., alphanumeric ASCII or UNICODE text) from the digital image for transaction processing. The imager 115 may be comprised of a portable flatbed scanner (i.e., a device having a mobile scan head), an object-fed scanner (i.e., a device having an object feeder and an immobile scan head), a handheld scanner (i.e., a device for manually positioning the scan head) or a digital camera (i.e., a point and shoot device). The imager 115 may employ a charge coupled device (CCD) array, a Time Delay Integration (TDI) CCD array, complementary metal oxide semiconductor (CMOS) image sensors or other sensors or devices for electronic image capturing. A light source such as ambient light or light from a lamp (e.g., a cold cathode fluorescent lamp, a xenon lamp, a fluorescent lamp or other light sources suitable for scanner use) may be used to illuminate the object being scanned. In the case of illumination using a lamp, the light source may continuously flood (i.e., illuminate) the object being scanned with light during the scanning process. The imager 115 may be fixed to, or removable from, the terminal 100. The type, size and resolution of the imager 115 may be selected to accommodate determined sizes of objects (e.g., credit cards, debit cards, checks, drivers licenses, bills of lading, meters and gauges) and information to be scanned (e.g., embossed or printed alphanumeric characters, signatures, meter or gauge displays or barcodes) and to resolve determined information from the images.

Display 110, an optional component, may display various amounts of textual and/or graphical information. It may be a monochrome or color display, of various physical dimensions, of various types (e.g., an active matrix or passive matrix liquid crystal display). The display may also include a touch-sensitive overlay capable of receiving input.

The digitizer 125 enables manual entry of data and/or commands. By way of example, the digitizer may include a touch-sensitive display overlay and associated circuitry. A user may input data and commands with a stylus or by touch. A touch sensitive pad may be provided in lieu of or in addition to the overlay for inputting data such as a signature.

A suitable location system 165 may accommodate manual input of location information, automatic location determination based on signals received from external sources, and/or determination of location from location reference data in captured images. An automatic location determination system may be comprised of various Global Positioning System (GPS) circuitry and software. By way of example and not limitation, NEC Corporation's μPD77534 and μPB1009 chipset, or the UAA3536 single-chip transceiver by Koninklijke Philips Electronics N.V. Philips may be used. A GPS system receives signals transmitted from a plurality of satellites (e.g., four satellites) and processes the signals to determine a location by calculating the distance from each satellite. For improved accuracy, corrections (e.g., to account for variations in satellite signal transmission speed due to environmental conditions and obstacles) may be obtained (i.e., received via transceiver 150) from a nearby GPS receiver at a known fixed location. In one embodiment, the location information (e.g., World Geodetic System coordinates, WGS-84) may be used to obtain information from an electronic almanac, to determine a street address or other position information for the terminal. The almanac may be stored on the terminal or accessible on a remote system via a communications network. The location system is operatively coupled or connected to the processor, meaning it is directly or indirectly communicatively connected to the processor such that output from the location system (e.g., location signals or data) can be provided to and processed using the processor.

An alternative automatic location system to GPS is a ground-based radio navigation system. For example, a system that employs high-frequency radio waves (e.g., UHF signals) can provide accurate position location for a relatively small localized area.

A manual location system would require entry of location information. Location information may be selected from a list of possible locations, or entered by address or other indicator of location.

An image-based location system may use image recognition to produce location information from images of location indicators. For example, such images may include images of managed service point barcodes along postal routes.

A suitable keyboard 120 may include keypads or keypad icons displayed on the display 110. Display icons may be selected using a stylus in the case of a touch-sensitive display or other pointing or selection device in the case of a display that is not touch sensitive. The number of available keys may vary to suit particular applications and user preferences. The keyboard, digitizer, overlay and pointing device are each input devices.

A removable or non-removable nonvolatile storage device 140 such as a hard disk, nonvolatile solid state memory such as an EEPROM (e.g., CompactFlash, SmartMedia, Memory Stick, and PCMCIA Type I and Type II memory) and/or other non-volatile storage equipment is provided for storage of programs and data. Each type of storage has advantages and disadvantages. For example, as compared to a hard disk, non-volatile memory is noiseless, allows faster access, is smaller in size, is lighter, has no moving parts, consumes less power and is less vulnerable to physical shock. On the other hand, the cost per megabyte of storage for a hard disk is less, and the capacity is typically substantially greater.

The processor 130 may include a microprocessor or other devices capable of being programmed or configured to perform computations and instruction processing in accordance with the invention. Such other devices may include digital signal processors (DSP), Field Programmable Gate Arrays (FPGA), application-specific integrated circuits (ASIC), discrete gate logic, or other integrated circuits, hardware or firmware in lieu of or in addition to a microprocessor.

Various ports and interfaces may be provided to communicate with peripherals, subsystems and systems. Such devices may include serial ports 145 for bi-directional communications, an Ethernet port 155 for network communications, and an optical communications (e.g., infrared) port 160 for wireless line of sight communications. Other ports may include parallel and USB ports.

A transceiver 150 is also provided for wireless communications. An RF transceiver uses an antenna to radiate and capture radio signals. It may be adapted for cellular communications. Because cellular transceivers communicate with local base stations, they allow use of low power transmitters (e.g., 0.6 to 3.0 Watts). The transceiver is operatively coupled or connected to the processor, meaning it is directly or indirectly communicatively connected to the processor such that output from the transceiver (e.g., received signals or data) can be provided to and processed using the processor.

Software for implementing a device and methodology in accordance with the invention may be stored on the nonvolatile storage device. The software may include an operating system, one or more application programs, other program modules, and program data. Firmware, application specific integrated circuits and other manifestations of computer processing instructions and data may be employed in lieu of or in addition to software without departing from the scope of the invention. As used herein programs, applications and modules refer to computer software, which broadly includes software components, fully functional software applications and software suites.

Figure 2:
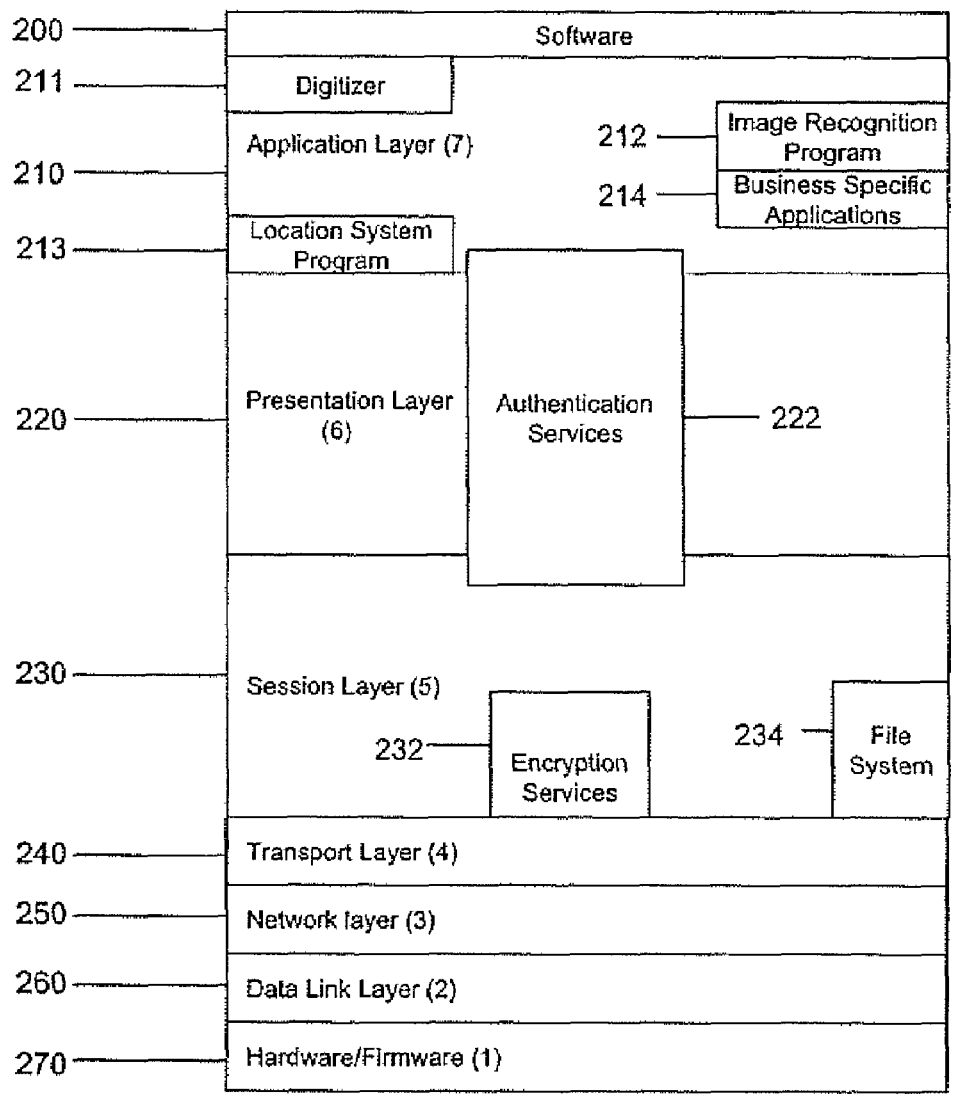
FIG. 2 shows a block diagram of a layered software architecture for a transaction terminal in accordance with an exemplary embodiment of the invention.

Now referring to FIG. 2, a block diagram of a layered software architecture 200 for a transaction terminal in accordance with the invention is shown. Seven layers in accordance with the OSI, or Open System Interconnection, model define a framework for implementing protocols. In communicating across a network, control is passed from one layer to the next, starting at the application (seventh) layer in one node, proceeding to the bottom layer, over the communication channel to the next node and up the hierarchy. The seventh layer, the application layer 210, supports application and end-user processes. This layer provides application services for transaction processing and other software services.

An image recognition program 212 (also referred to herein as an image recognition module and system) extracts (or processes) information from image data produced using the imager and/or digitizer. The image recognition program 212 then prepares the information for use in another format. Examples of such extraction include recognizing handwriting and producing ASCII (or UNICODE) characters based thereon; recognizing barcodes or alphanumeric characters from an image of an object (such as a credit card, debit card, smart card, check, driver's license, mail pieces or bill of lading information or information displayed on a meter or a gauge) and producing ASCII (or UNICODE) characters based thereon. The image recognition program should be selected (or designed) according to the intended use. By way of example, U.S. Pat. No. 5,805,710 discloses an optical character recognition (OCR) method for cursive addresses using an adaptive dictionary. Other OCR programs suitable for image recognition include OCR for AnyDoc™ by Any-Doc Software, Inc.; OmniPage® Pro by ScanSoft, Inc.; PrimeOCR™ by Prime Recognition, Inc.; and Zone OCR™ by ColumbiaSoft Corp.

The application layer 210 may also include additional programs to enable use of other features and components of the terminal. By way of example, digitizer software 211, location system (e.g., GPS) software 213 and business specific applications 214 may be provided for overall process control.

Terminal functions, input, output and communications are controlled by business specific applications 214. The terminal may include a plurality of business-specific applications, each of which may operate independently or use one or more other business-specific applications to perform a process. For instance, a point of sale application may use the image recognition program 212 to obtain credit card information (e.g., account number, expiration date and cardholder's name) from a scanned image of the credit card.

The sixth layer, the presentation layer 220, transforms data into a form that the application layer can accept. This layer also provides authentication services 222 controlling security at the file level. Thus, this layer provides file locking and user security to protect sensitive data and guard against unauthorized access. The application layer 210 and the session layer 230 may also be used to provide authentication services 222.

The fifth layer, the session layer 230, establishes, manages and terminates connections between applications. The session layer sets up, coordinates, and terminates conversations, exchanges, and dialogues between applications. It also provides encryption services 232 and file system management 234.

The fourth layer, the transport layer 240, provides transfer of data between nodes, and is responsible for end-to-end error recovery and flow control. It helps ensure complete data transfer.

The third layer, the network layer 250, provides switching and routing technologies, creating logical paths for transmitting data from node to node. This layer also provides addressing, internetworking, error handling, congestion control and packet sequencing.

The second layer, the data link layer 260, encodes and decodes data packets into bits. It furnishes transmission protocol knowledge and management and handles errors in the physical layer, flow control and frame synchronization. This layer controls how another computer on the network may gain access to the terminal's data.

This first layer, the physical layer 270, conveys bit streams—electrical impulses, light or radio signals—through the network at the electrical and mechanical level. It provides the hardware and firmware for means of sending and receiving data.

The OSI model is but one example of a structured architecture suitable for a terminal in accordance with the invention. Those skilled in the art will appreciate that other architectures may be used without departing from the scope of the present invention.

Figure 3:
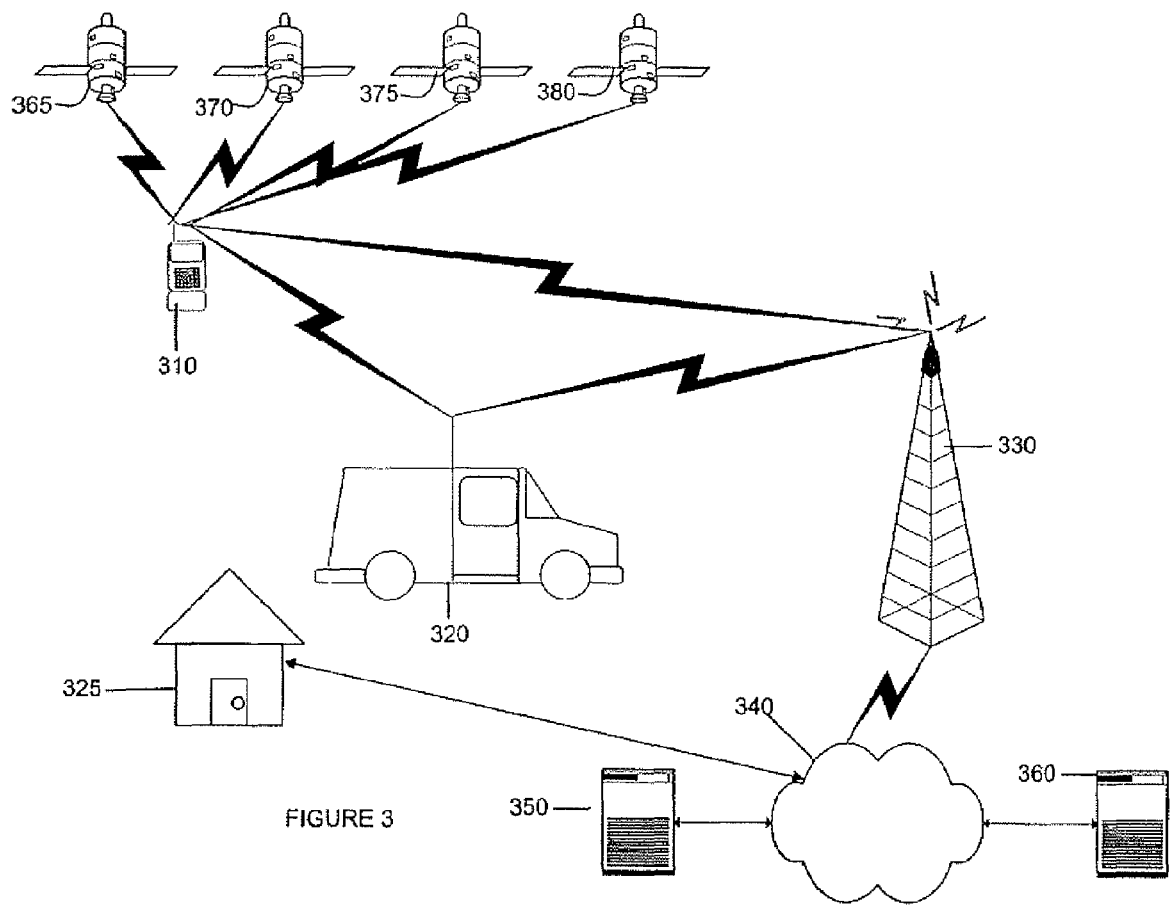
FIG. 3 shows a network diagram for a portable transaction terminal system in accordance with an exemplary implementation of the invention.

Referring now to FIG. 3, a network diagram shows a portable transaction terminal 310 in accordance with the invention. The terminal 310 optionally receives GPS signals from satellites 365-380 to determine location of the terminal at the time of a transaction. Alternatively, location information may be manually entered, obtained via image recognition, or determined from other signal sources, The terminal 310 may process a transaction, which may entail producing an image such as an image of a credit card and performing image recognition to obtain information from the image such as a credit card number, expiration date and cardholder's name. To process payment, the terminal may communicate with one or more remote computer systems 350 and 360 via RF communications with a nearby object such as a vehicle 320, a cellular communications network 330, and/or one or more communicatively coupled wired networks such as the Internet 340. Such communications are encrypted for security. Remote computer systems may provide transaction services, such as credit and debit card approval and payment processing, storage of transaction data, and inventory management. Card approval and payment processing typically entails communicating requests to a service provider who will verify the merchant's identification, the card number, that the card is unexpired, and that the transaction amount is within the card limit.

In batch mode, information may periodically be communicated to, and received from, a determined system 325. Connectivity may be established either wirelessly or via a wired link. For example, the terminal may periodically be docked in a cradle that is communicatively coupled to the determined system 325; linked to the determined system 325 via a serial, parallel or USB port or network connection; placed in a line of sight for optical (e.g., IrDA) communications with the determined system 325; or placed in proximity to the determined system 325 for RF communications.

A system in accordance with the invention thus offers several advantages over conventional portable point of sale systems. The location of the terminal at the time of a transaction can be automatically recorded. This may be used to facilitate transactions while providing additional protection against fraud and errors such as by comparing the location with a cardholder's billing address for transactions at a consumer's home, comparing the location with a delivered object's addressee, confirming the correct location of a transaction (e.g., determining the location of a traffic citation), and obviating the need to manually enter address information (e.g., while obtaining utility meter readings). As the terminal can automatically enter visible transaction information (e.g., card information, barcodes, UPC codes, meter readings, drivers license, automobile registration, insurance and mail piece information) using the imager and image recognition program avoids the problems associated with magnetic stripe readers, and the need for special smart card processing equipment as those cards become more prevalent.

METHOD OF THE INVENTION

Figure 4:
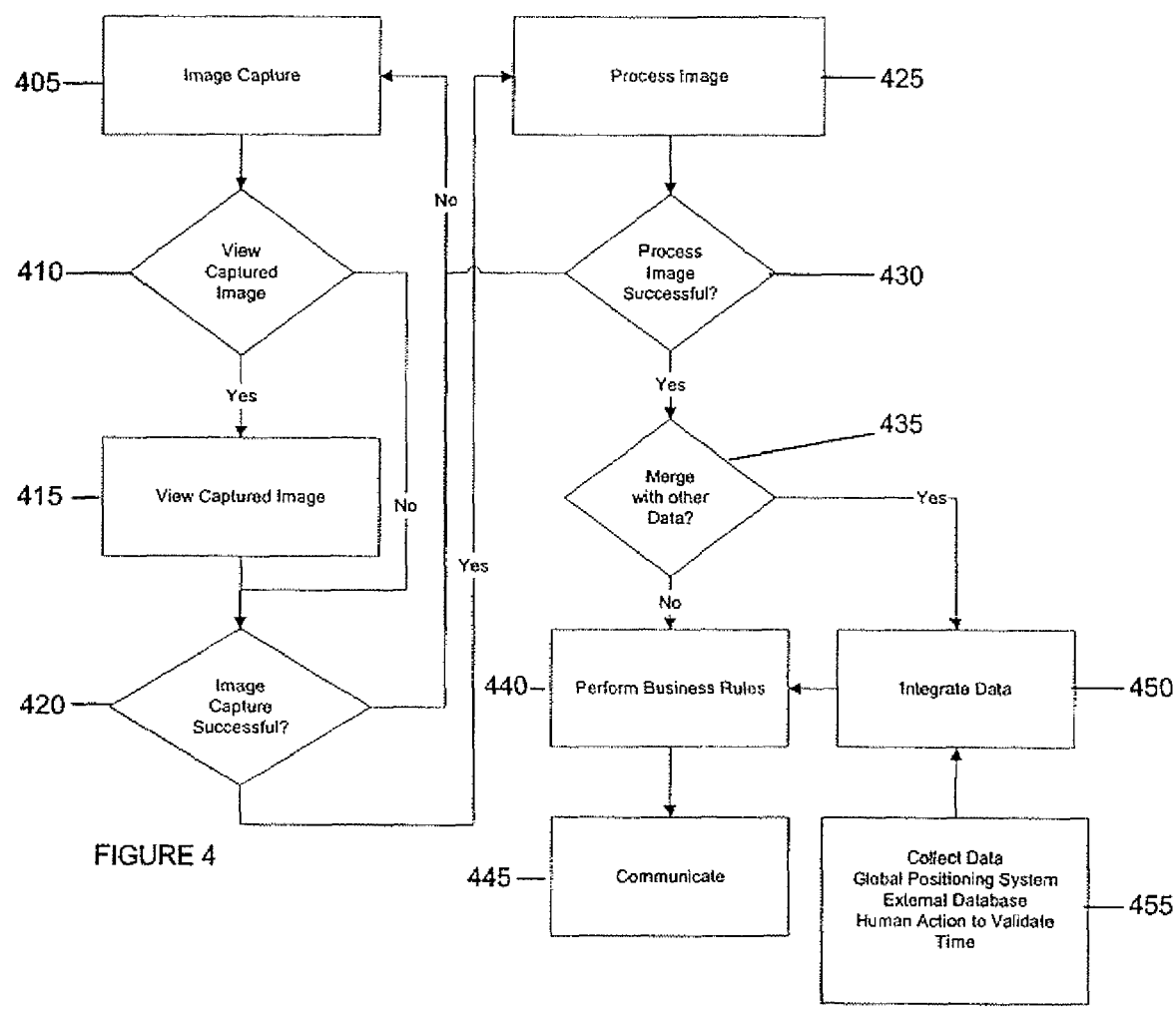
FIG. 4 shows a flow chart for a process in accordance with an exemplary implementation of the invention.

Referring now to FIG. 4, a flow chart for a process in accordance with the invention is shown. The steps of the invention may be implemented via computer program code in combination with appropriate hardware. The computer program code may be stored on storage media such as a hard disk, on a memory storage device, or on other storage devices. Additionally, the computer program code can be transferred to a terminal via network communications or communications through a port. FIG. 4 may equally represent a high level block diagram of an exemplary system in accordance with the invention, implementing the steps thereof.

In step 405, an image is captured in digital form using the imager. The image may be of an object that contains text, a barcode, indicator positions on an instrument gauge, handwritten letters (cursive or printed), or other visible indicia, or a photograph of a person or object.

Next, in step 410, a decision is performed whether to view the captured image. The decision to view an image may be by system design, hardware or software functions. If the image will be viewed, the image is displayed in step 415. Of course, this step would only be performed if the terminal includes a display.

Next, in step 420, a determination is made if the image capture was successful. The decision is performed by system design, hardware or software functions. If the image capture was successful, then processing continues to step 425. If the image capture was not successful, then the process may begin again or terminate.

In step 425, the image is processed. Relevant information is extracted or produced from the image. The information may also be prepared for use in another format, which may be an image or non-image format (e.g., ACSII or UNICODE). An example of extracting or producing information from an image is recognizing handwriting and converting the handwriting to ASCII or UNICODE characters. Another example is recognizing a dial indicator on a power meter and converting indicator positions into numeric ASCII character values. Yet another example is recognizing indicia such as alphanumeric data and producing ASCII or UNICODE character values based thereon. A further example is recognizing a barcode, such as a barcode at a managed service point along a postal carrier's route. Still another example is producing an association between an image and a transaction. Thus, illustratively, a person's photograph may be associated with a point-of-sale transaction, or a photograph of a traffic accident may be associated with data pertaining to the accident.

If the image processing step 425 was unsuccessful, then the process may provide a status message for the application to determine how to address the anomaly. One possible solution would be to retry the process from step 405. Another possible solution would be to manually enter the necessary data using a keypad or other data entry device. Of course, if the image processing step 425 succeeded, then control proceeds to step 435.

In step 435, a determination is made as to whether the data produced from the image processing step 425 should be merged with other data. If other data is required for a transaction, then the application must obtain the needed data from either an internal or external source and integrate the data as in step 450. Integration entails associating data from the other source with the data from the image processing step 425. For example, a credit card payment approval code, which may be required for a point of sale transaction, can be obtained from remote computer systems and service via network communications. To complete a point of sale transaction, the code can be combined with credit card data obtained from a scanned image of the card. By way of example, other information that may be merged includes location information, external database information, human commands to validate and time data, as in step 455.

In step 440, one or more applications utilize some or all of the data to perform business rules (e.g., transaction steps). By way of example and not limitation, the data may be stored, used as values for variables in algorithms, or otherwise processed, managed or utilized by one or more applications.

Next, in step 445, communication with an external device is performed to provide system functionality. Data from the transaction, along with data from other transactions and other terminals, is stored in an external database for centralized management and data rules. Communication may be by RF transceiver, optical port, removable media, docking, serial port, or other communication means.

Illustratively, the transaction terminal and methodology may be used by a mail carrier in delivering an object such as a mail piece (e.g., a flat or parcel) requiring a signature to verify receipt. Upon delivery, the mail carrier may use the terminal to produce an optically scanned image of the addressee portion of the mail piece. The image recognition module may produce ASCII data corresponding to the address in the image. A signature image may be obtained from the recipient using the digitizer. Location data may be determined automatically using the GPS system. The date and time of the transaction may also be determined. The transaction data (i.e., delivery time, date, location, address and signature) may then be communicated to a computer system for management and archival purposes.

If the transaction further requires payment processing at the point of delivery, the carrier may use the terminal to produce an optically scanned image of a credit card presented by the recipient. The side of the credit card containing account information (typically embossed letters) or both sides of the credit card may be scanned. The image recognition module may produce ASCII data corresponding to the credit card information from the image of the front of the card. The image recognition program may also determine the security code and detect the presence of a signature on the back of the card. The credit card information may then be communicated wirelessly to a computer network for approval and processing. The terminal will receive a response approving or denying the payment. In the event of approval, a signature may be obtained from the recipient using the digitizer. The terminal may also compare location information with card billing address information (which may be automatically provided from the card payment service provider) for fraud protection. If the location information does not correspond to the card billing address, then the carrier may request (and capture an image of) additional identification to reduce the risk of a fraudulent transaction. As an additional precaution, a digital photograph of the customer may be taken and associated with the transaction.

While the invention has been described in terms of various embodiments, implementations and examples, those skilled in the art will recognize that the invention can be practiced with modification within the spirit and scope of the appended claims.

What is claimed:

1. A portable transaction terminal comprising:
   a processor;
   an imager configured to produce a digital image of a payment card using a source of continuous light, the imager being operably linked to the processor; and
   an image recognition module that performs image recognition and that is configured to produce or extract data for a transaction, from the digital image of the payment card, using the processor,
   wherein the portable transaction terminal is configured to enter the data for the transaction that is produced or extracted, and wherein the data for the transaction is communicated and processed.

2. The portable terminal of claim 1, wherein the imager is comprised of a device from the group consisting of:
   a flatbed scanner having a mobile scan head;
   an article-fed scanner having an article feeder and an immobile scan head; a handheld scanner configured for manual positioning; and
   a digital camera.

3. The portable terminal of claim 1, further including one or more communications devices configured for communications with a peripheral subsystem or system.

4. The portable terminal of claim 3, wherein the one or more communications devices include a transceiver for wireless communications, the transceiver being operably linked to the processor.

5. The portable terminal of claim 4, wherein the transceiver is configured to communicate via radio frequency.

6. The portable terminal of claim 1, further comprising a location system operably linked to the processor.

7. The portable terminal of claim 6, wherein the location system is comprised of a global positioning system configured to receive and process signals from a plurality of satellites to determine the location of the terminal, the location system being operably linked to the processor.

8. The portable terminal of claim 7, wherein the global positioning system is configured to further receive and process one or more signals from a global positioning system transceiver at a known location to enhance accuracy of the determined location of the terminal.

9. The portable terminal of claim 6, wherein the location system is configured to receive manually entered location data.

10. The portable terminal of claim 6, wherein the location system is configured to produce location information from the digital image.

11. The portable terminal of claim 1, wherein the payment card comprises one of a debit car and a credit card.

12. The portable terminal of claim 1, wherein the source of continuous light is ambient light.

13. The portable terminal of claim 1, wherein the source of continuous light is a lamp.

14. The portable terminal of claim 13, wherein the lamp is one of a cold cathode fluorescent lamp, a xenon lamp and a fluorescent lamp.

15. The portable terminal of claim 1, wherein the portable transaction terminal is configured to (i) automatically enter the data produced or extracted for the transaction, (ii) communicate the data for the transaction for approval and processing, and (iii) receive an approval or a denial response.

16. A portable transaction terminal comprising:
a processor;
an imager configured to produce a digital image of a payment card using a source of continuous light, the imager being operably linked to the processor;
an image recognition module that performs image recognition and that is configured to produce or extract data for a transaction from the digital image using the processor; and
a display operably linked to the processor, the display being configured to display data from the digital image or the digital image,
wherein the portable transaction terminal is configured to (i) automatically enter the data produced or extracted for the transaction, (ii) communicate the data for the transaction for approval and processing, and (iii) receive an approval or a denial response.

17. The portable terminal of claim 16, wherein the source of continuous light is ambient light.

18. The portable terminal of claim 16, wherein the source of continuous light is a lamp.

19. The portable terminal of claim 18, wherein the lamp is one of a cold cathode fluorescent lamp, a xenon lamp and a fluorescent lamp.

20. The portable terminal of claim 16, wherein the imager is comprised of a device from the group consisting of:
a flatbed scanner having a mobile scan head;
an article-fed scanner having an article feeder and an immobile scan head;
a handheld scanner configured for manual positioning; and
a digital camera.

21. The portable terminal of claim 16, further comprising a transceiver configured for wireless communications, the transceiver being operably linked to the processor.

22. The portable terminal of claim 16, further comprising a location system operably linked to the processor.

23. The portable terminal of claim 16, wherein the payment card is one of a debit card and a credit card.

24. A method of transaction processing using a portable transaction terminal having an imager and an image recognition module, the method comprising:
producing an image corresponding to a payment card;
performing image recognition of the image;
producing transaction information from image data that is produced or extracted from the image;
entering, with the portable transaction terminal, the transaction information so that the
transaction information is communicated and processed; and
performing one or more transaction steps using the transaction information produced from the image data.

25. The method of claim 24, further comprising obtaining location data representing a location of the portable transaction terminal.

26. The method of claim 24, further including a step of communicating the transaction information to a system, subsystem or peripheral.

27. The method of claim 24, wherein the transaction information comprises a name on the payment card, a number on the payment card, and an expiration date on the payment card.

28. The method of claim 24, wherein the entering comprises automatically entering the transaction information and the method further comprises communicating, with the portable transaction terminal, the transaction information for approval and processing, and receiving, with the portable transaction terminal, an approval or a denial response.

29. A portable transaction terminal comprising:
a power supply;
an input device for entering data and for obtaining a signature of a recipient;
a processor;
an imager producing a digital image of a payment card using a source of continuous light during production of the digital image, the imager being operably linked to the processor;
an image recognition module producing or extracting relevant alphanumeric or text data for a transaction, from the digital image, using the processor;
a display displaying the digital image; and
an automatic location determination system that determines a location of the portable transaction terminal at the time of the transaction,
wherein the portable transaction terminal automatically enters the data for the transaction that is produced or extracted, determines a date and time of the transaction, communicates with one or more remote computer systems using encryption, and receives communications from the one or more remote computer systems indicating approval or denial of the transaction.

* * * * *